(12) United States Patent
Kirby

(10) Patent No.: US 8,776,834 B2
(45) Date of Patent: Jul. 15, 2014

(54) DEVICE FOR THE DEFLECTION OF THE AIR JET PULSE FROM THE AIR DRYER OF LARGE TRUCK AIR BRAKES

(76) Inventor: Rick Kirby, Trenton, TX (US)

( * ) Notice: Subject to any disclaimer, the term of this patent is extended or adjusted under 35 U.S.C. 154(b) by 689 days.

(21) Appl. No.: 12/807,200

(22) Filed: Aug. 31, 2010

(65) Prior Publication Data

US 2011/0048565 A1    Mar. 3, 2011

Related U.S. Application Data

(60) Provisional application No. 61/275,750, filed on Sep. 2, 2009.

(51) Int. Cl.
*F16L 55/00*    (2006.01)
*B60T 17/00*    (2006.01)
*B01D 53/26*    (2006.01)

(52) U.S. Cl.
CPC ............. *B60T 17/002* (2013.01); *B01D 53/261* (2013.01)
USPC .......................................................... 138/103

(58) Field of Classification Search
CPC .... B60T 17/002; B60T 17/004; B01D 53/261
USPC ...................... 138/42, 103; 188/352; 303/127
See application file for complete search history.

(56) References Cited

U.S. PATENT DOCUMENTS

| | | | | |
|---|---|---|---|---|
| 3,356,390 | A * | 12/1967 | Dahlgren et al. | 285/27 |
| 4,387,914 | A * | 6/1983 | Paulson et al. | 285/119 |
| 4,554,721 | A * | 11/1985 | Carty et al. | 29/416 |
| 5,247,967 | A * | 9/1993 | Bourque | 138/99 |
| 5,301,984 | A * | 4/1994 | Farris | 285/55 |
| 5,531,484 | A * | 7/1996 | Kawano | 285/179.2 |
| 6,878,194 | B2 * | 4/2005 | Hoffman et al. | 96/147 |
| 7,008,472 | B2 * | 3/2006 | Fornof et al. | 96/136 |
| 7,300,074 | B1 * | 11/2007 | Paulson | 285/179 |
| 7,312,407 | B2 * | 12/2007 | Case | 285/179 |
| 2005/0188848 | A1 * | 9/2005 | Salzman et al. | 96/134 |
| 2006/0236558 | A1 * | 10/2006 | Hoffman et al. | 34/351 |
| 2007/0028777 | A1 * | 2/2007 | Hoffman et al. | 96/143 |
| 2008/0110340 | A1 * | 5/2008 | Hoffman et al. | 95/118 |

* cited by examiner

*Primary Examiner* — Paul R Durand
*Assistant Examiner* — Vishal Pancholi
(74) *Attorney, Agent, or Firm* — Ilya Libenzon

(57) ABSTRACT

The air deflection device prevents the development of a cloud of dirt and debris when the air dryer essential to the air brakes of large trucks or other vehicles ejects a high velocity pulse of air from the bottom of the air dryer onto the ground. The air deflection device deflects the pulse of air away from the ground harmlessly toward the engine and transmission of the truck. The air deflection device is designed and configured so as to easily fit and be fastened to the bottom of a truck's air braking system air dryer. The pulse of air from the air dryer is routed through the air deflection device in such a manner as to be harmlessly directed toward the engine and transmission of the large truck.

8 Claims, 3 Drawing Sheets

DEVICE FOR THE DEFLECTION OF THE AIR JET PULSE FROM THE AIR DRYER OF LARGE TRUCK AIR BRAKES

CROSS-REFERENCE TO RELATED APPLICATIONS

This application makes reference to and seeks priority of U.S. Provisional Patent Application No. 61/275,750 filed on Sep. 2, 2009.

STATEMENT REGARDING FEDERALLY SPONSORED RESEARCH OR DEVELOPMENT

No part of the conception or development of the invention disclosed herein was the subject of any Federally sponsored research or development

THE NAMES OF THE PARTIES TO A JOINT RESEARCH AGREEMENT

Not applicable.

REFERENCE TO A "SEQUENCE LISTING"

Not applicable.

BACKGROUND OF THE INVENTION

Field of the Invention

The field of the invention disclosed herein is the air braking system for large trucks. Specifically, the invention disclosed here is attached to the air dryer of the aforementioned air braking system to divert the jet pulse of air away from the ground.

Large trucks haul massive loads at high speeds on the nation's roads and highways. Because of the high speeds and heavy loads carried by these trucks, special brakes have been designed to slow and stop the truck in a safe manner at the command of the driver. Many of these brakes depend on air pressure rather than hydraulic fluid to activate the braking mechanism on the truck wheel. In order for these air brakes to function effectively, the air must be kept dry and free of contaminants and impurities. The air in the air brake system is dried and cleansed by means of a of an air dryer mechanism which consists of a canister which is filled with a desiccant and through which the air in the air brake system is cycled. The desiccant in the air drier removes the water from the air flowing through the air dryer. Periodically, the water collected in the desiccant of the air dryer must be removed. A sensor attached to the air dryer measures the amount of water in the air dryer and when the amount of water reaches a predetermined threshold, the sensor activates the dryer to eject a pulse of air at high velocity out of the bottom of the air dryer. The excess water in the air dryer is expelled from the air dryer along with the pulse of air. If the truck is sitting on a gravel or dirt surface when the air dryer ejects the pulse of air, a cloud of dirt and debris is created by the pulse of air. This cloud of dirt can create a safety hazard by obscuring the vision of the driver. The cloud of dirt can foul air intake filters, thereby diminishing the efficiency of the truck engine and diminishing the fuel efficiency of the truck. If the driver or other person happens to be standing by the truck when the air pulse is ejected from the air drier, that individual may be covered with dirt and debris. Finally, if the door or window to the truck cabin is open when the air pulse is ejected from the air drier, the interior of the truck cabin may be covered with dirt and debris. What is needed in the art is a device to deflect the pulse of air ejected from the bottom of the air dryer in another direction to prevent the creation of the cloud of dirt and debris when the air pulse is ejected from the air dryer.

BRIEF SUMMARY OF THE INVENTION

The invention disclosed herein is a device to deflect the pulse of air ejected from the bottom of the air dryer in another direction to prevent the creation of a cloud of dirt and debris. The invention disclosed herein is a device designed and configured to be fastened to the bottom of the air dryer associated with the air braking system of large trucks and/or other vehicles equipped with an air braking system. The device disclosed herein is further designed to have a port or opening which fits over the area of the air dryer ejection port on the bottom of the air dryer. The aforementioned port or opening is so configured so as to direct the pulse of air from the bottom of the air dryer through the device disclosed herein and out an ejection port designed and configured into the side of the air deflection device disclosed herein. The aforementioned ejection port is so configured so as to direct the pulse of ejected air from the air dryer away from the ground and toward the engine or transmission of the truck. This arrangement in which the air pulse is redirected toward the engine or transmission of the truck prevents the development of the cloud of dirt and debris.

BRIEF DESCRIPTION OF THE SEVERAL VIEWS OF THE DRAWING

A better understanding of the invention disclosed herein may be had be examination of the following figures/drawings.

DESCRIPTION OF THE INVENTION

Figure 1:
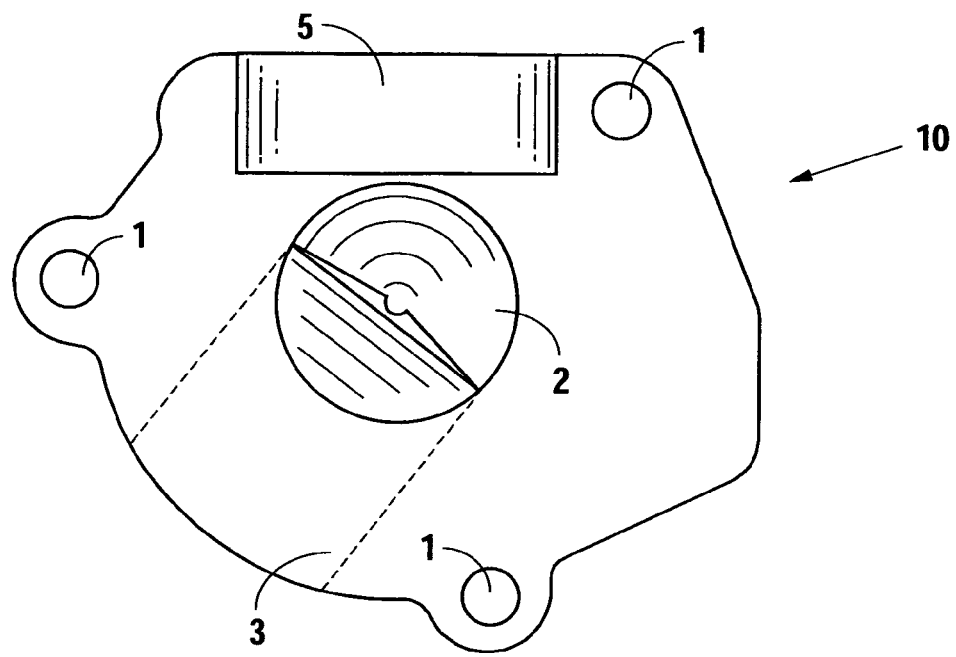
FIG. 1 is a top view of the air deflector device disclosed herein.

The invention disclosed herein is an air deflection device to divert the pulse of air from the bottom of a truck air braking system air dryer 7 away from the ground and toward the engine and transmission of the truck. FIG. 1 is a drawing showing the top surface of the air deflection device 10 disclosed herein. The top surface of the air deflector device 10 is fastened to the bottom of the air dryer through screws or other fasteners inserted into holes 1 configured to fit the fasteners located on the bottom of the air dryer 7. This arrangement of holes for fastening the air deflector device 10 to an air dryer 7 may vary according to the differences in the configuration of the receptor holes on other makes and models of air dryers. An intake port 2 fits over the air jet ejection port 6 located on the bottom of the air dryer 7. The intake port 2 is connected to the outside lateral wall of the air deflection device 10 by a channel 3 which traverses through the material used to construct the air deflection device 10. When the sensor of the air dryer 7 determines that sufficient water has accumulated in the air dryer 7, the pulse of air ejected from the air dryer enters the intake port 2 and travels through the channel 3 where it is expelled in a direction away from the ground and toward the engine and transmission of the truck.

Figure 2:
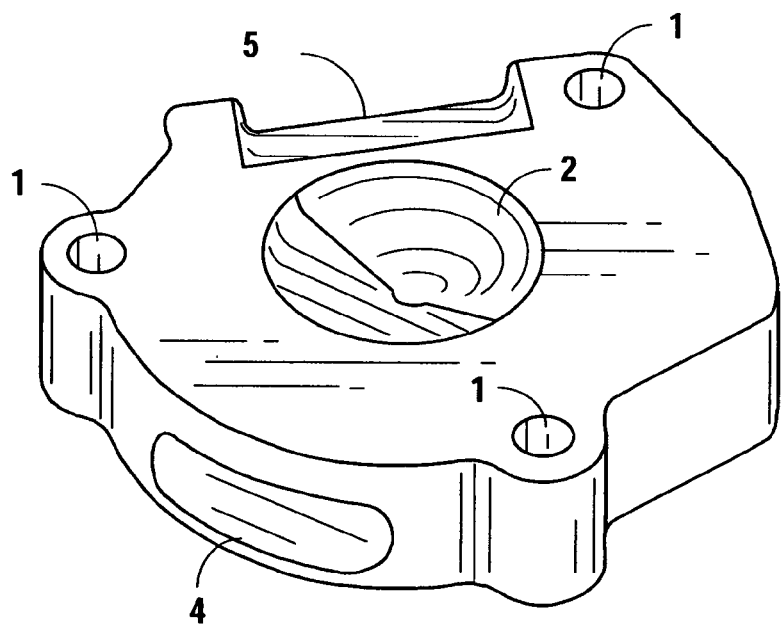
FIG. 2. Is an oblique side view of the air deflector device disclosed herein.

FIG. 2 shows the relationship of the intake port 2 and the outlet port 4 from which the air pulse is expelled. The intake port 2 and the outlet port 4 are connected by the internal channel 3 which traverses through the air deflector device 10. The jet pulse of air which enters the inlet port 2 is deflected at approximately a 90° angle to exit through the outlet port 4 and is deflected toward the truck engine or transmission rather than toward the ground.

Figure 3:
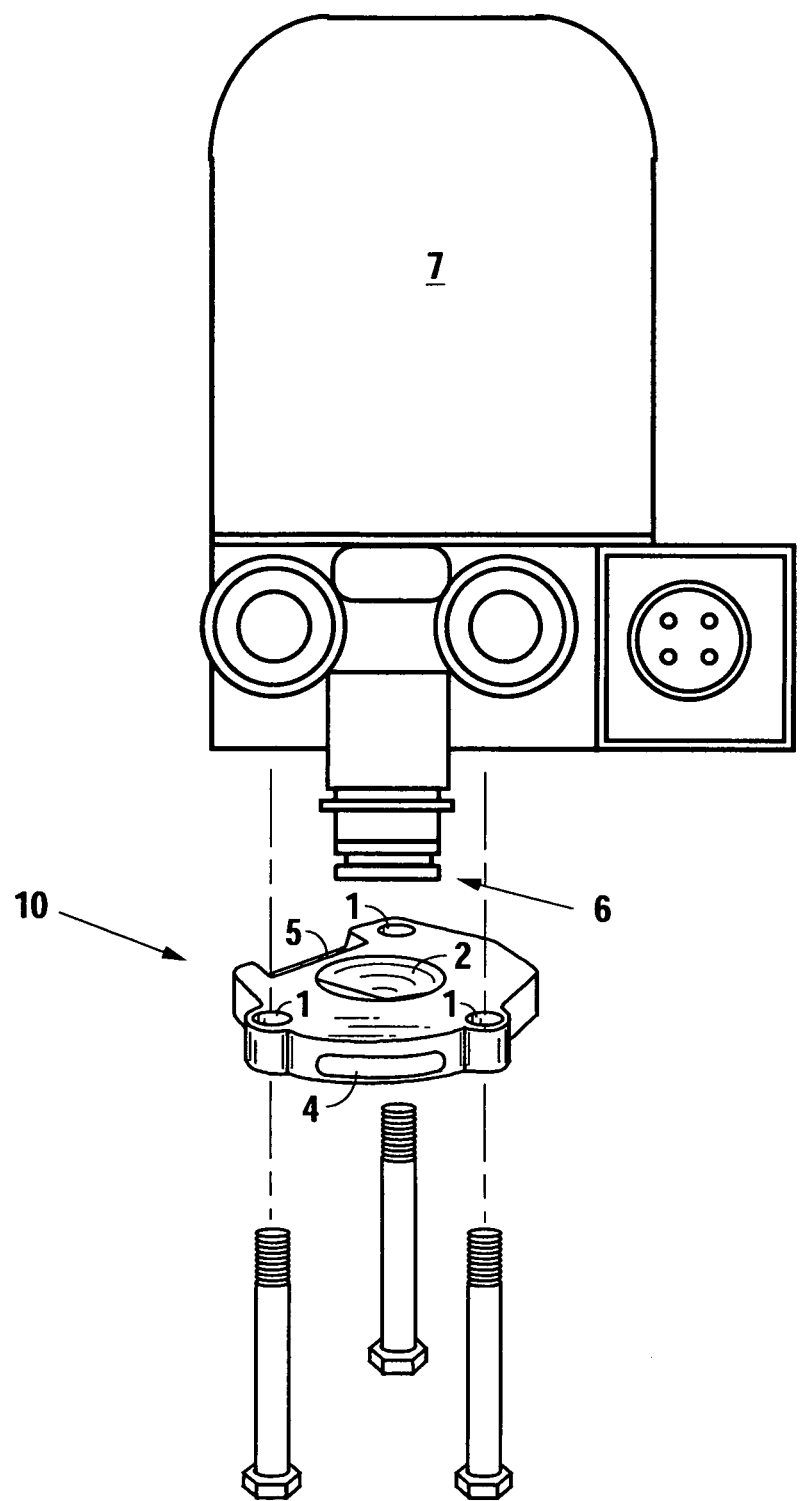
FIG. 3 is a side view of an air dryer for an air braking system.
Figure 4:
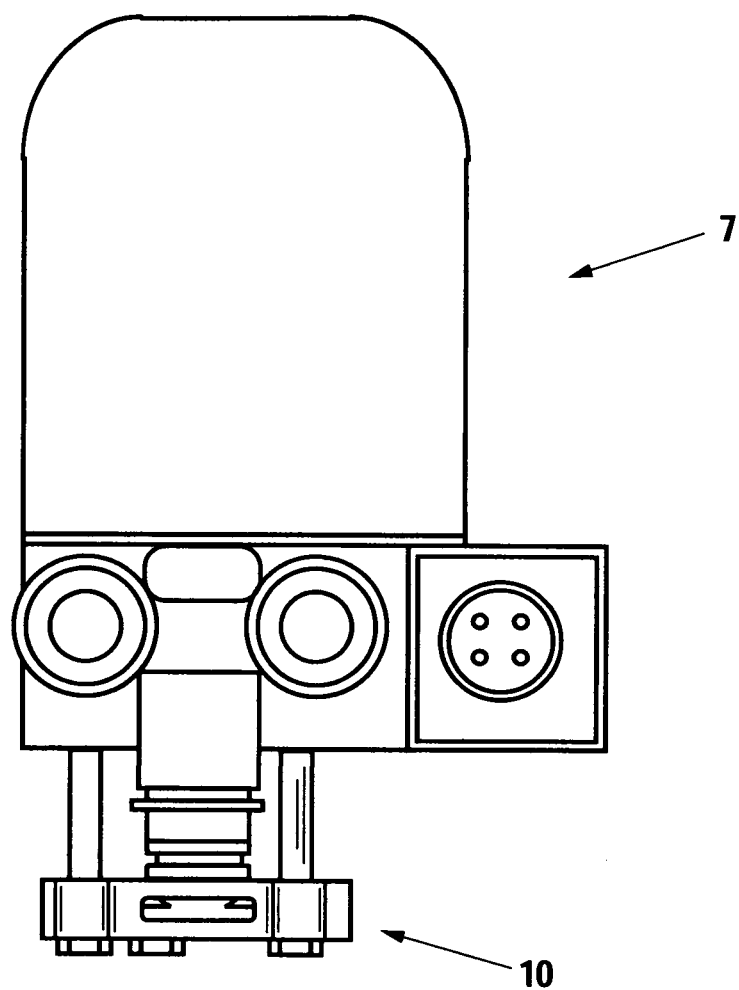
FIG. 4 shows the attachment of the air deflector device to the air dryer of an air braking system.

As shown in FIGS. 3 and 4, the air deflection device 10 disclosed herein is attached to the bottom of the air dryer 7 of the air braking system through fasteners extending through holes 1 and into corresponding holes in the bottom of the air dryer 7 so as to cover the air jet ejection port 6 on the air dryer 7. The air jet ejection port 6 of the air dryer 7 fits into the inlet port 2 of the air deflection device 10 disclosed herein. When sensors located in the air dryer 7 detect that a sufficient amount of water has accumulated in the air dryer 7, the water is expelled from the air dryer 7 by a jet pulse of air through the air jet ejection port 6 and into the inlet port 2 of the air deflection device 10 disclosed herein. The jet pulse of air from the air dryer 7 continues to travel through the internal channel 3 of the air deflection device 10 and exit through the outlet port 4, where the jet air pulse is deflected at approximately a 90° angle toward the engine and transmission of the truck. In this manner the jet air pulse from the air dryer 7 does not hit the ground and create a cloud of dust and debris.

The invention disclosed herein may be constructed from a number of different materials including plastic, aluminum, steel, iron and other materials. The air deflection device disclosed herein may also be designed and configured in a myriad of shapes so as to accomplish the goal of deflecting the air away from the ground, thereby preventing the development of a dust and debris cloud when the air dryer expels a pulse of air through the ejection port located on the bottom of the air dryer. The air deflection device disclosed herein can be configured to fit on to any make and model of air dryer of any vehicle equipped with an air braking system. These other variations of the invention disclosed herein are specifically claimed to the extent supported by the specification and appended claims.

I claim:

1. A device to deflect the air jet pulse from an air dryer of an air braking system, the device comprising:
    a flat top surface having an intake port;
    a flat bottom surface;
    a channel between the top surface and the bottom surface, the channel having a first end connected to the intake port;
    a vertical lateral wall between the top surface and the bottom surface, the lateral wall surrounding the channel in its entirety, the lateral wall having an outlet port connected to a second end of the channel; and
    a means for connecting the device to the air dryer;
    whereby, the air jet pulse from the air dryer enters the inlet port, travels through the channel and exits the device through the outlet port to be deflected away from the ground.

2. A process for deflecting the air jet pulse from the air dryer of an air braking system, the process comprising:
    providing a device to deflect the air jet pulse from an air dryer of an air braking system according to claim 1;
    placing the intake port of the device over an air jet ejection port of an air dryer;
    fastening the device to the air dryer using the means for connecting the device; and
    deflecting an air jet pulse from the dryer away from the ground using the device.

3. A device according to claim 1, wherein the upper surface further comprises an indentation which enables the device to fit a particular model of air dryer.

4. A device according to claim 1, further comprising at least one hole opening on the upper surface and perforating the device.

5. A device according to claim 3, wherein the means for connecting the device to the air dryer comprises at least one fastener inserted through the at least one hole and attached to the air dryer.

6. A device according to claim 4, wherein the fastener is a screw.

7. A device according to claim 1, wherein the channel is formed to deflect the air approximately ninety degrees from the vertical.

8. A device according to claim 1, wherein the device is composed of a substantially rigid material.

* * * * *